(12) United States Patent
Chou et al.

(10) Patent No.: US 8,644,290 B2
(45) Date of Patent: Feb. 4, 2014

(54) COORDINATION-FREE RENDEZVOUS METHOD FOR A COMMUNICATION NETWORK

(75) Inventors: Chun-Ting Chou, Taipei (TW); Yeo-Sheng Wang, Taipei (TW)

(73) Assignee: National Taiwan University, Taipei (TW)

(*) Notice: Subject to any disclaimer, the term of this patent is extended or adjusted under 35 U.S.C. 154(b) by 425 days.

(21) Appl. No.: 12/758,214

(22) Filed: Apr. 12, 2010

(65) Prior Publication Data
US 2011/0249664 A1 Oct. 13, 2011

(51) Int. Cl.
*H04J 3/00* (2006.01)
(52) U.S. Cl.
USPC .............................. 370/345; 370/329; 455/430
(58) Field of Classification Search
USPC ................. 370/208–209, 280–281, 329–339, 370/347–350; 455/403
See application file for complete search history.

(56) References Cited

U.S. PATENT DOCUMENTS

| 2007/0177494 | A1* | 8/2007 | Tomizawa | 370/208 |
| 2008/0259811 | A1 | 10/2008 | Cordeiro et al. | |
| 2010/0316033 | A1* | 12/2010 | Atwal | 370/338 |
| 2011/0002243 | A1* | 1/2011 | Sherman et al. | 370/280 |

* cited by examiner

*Primary Examiner* — Ricky Ngo
*Assistant Examiner* — Iqbal Zaidi
(74) *Attorney, Agent, or Firm* — Stout, Uxa, Buyan & Mullins, LLP (57) ABSTRACT

In a coordination-free rendezvous method for a communication network, time is divided into superslots with each superslot being further divided into slots. At least one first-class slot and at least one second-class slot are selected out of the slots of each superslot. The relative position between the first-class slot and the second-class slot is changed every superslot, thereby the first-class slots or the second-class slots between or among devices of the communication network may overlap each other in a periodic manner.

13 Claims, 11 Drawing Sheets

FIG. 10d ated to a telecommunication network such as that of a cognitive radio or MANET protocol as mentioned above in the background of the invention.
COORDINATION-FREE RENDEZVOUS METHOD FOR A COMMUNICATION NETWORK

BACKGROUND OF THE INVENTION

1. Field of the Invention

The present invention generally relates to a telecommunication network, and more particularly to a coordination-free rendezvous protocol that provides communication windows or rendezvous to devices within a bound time, regardless of network environments.

2. Description of Related Art

A telecommunication network, such as the Internet or a wireless network, is a network of devices (or nodes) configured so that information may be transferred from one device to another device or devices. The telecommunication network, as either a synchronous or an asynchronous network, mostly requires the coordination of events among the devices such that the network may work as a well-coordinated network. However, synchronization schemes utilized to coordinate among devices normally require complicated protocols and extra infrastructures.

In a network that is not well-coordinated, provision of meeting (or communication windows, or rendezvous) is thus critical for communicating efficiently between or among devices. For example, dynamic spectrum access (DSA) or cognitive radio is a promising technology used for improving spectrum utilization in a wireless network. Specifically, licensed devices in such networks should be protected from interference by secondary operations of unlicensed devices. The unlicensed devices thus have to detect the signal of licensed devices in a timely manner. However, as the unlicensed devices are uncoordinated amongst themselves, they may not effectively detect the licensed devices.

A mobile ad hoc network (MANET) is another example that requires rendezvous among devices. Devices in the MANET usually enter a sleeping mode when there is no data to transmit or receive in order to preserve their limited battery power. As a result, devices that need to transfer data usually encounter deferral issues, or even in a worst-case situation, devices may not be able to reach each other forever if their sleeping patterns are not coordinated.

For the reason that devices in conventional telecommunication networks, such as of cognitive radio or MANET protocol, could not effectively meet or rendezvous each other, a need has arisen to propose a coordination-free rendezvous protocol that provides some rendezvous to the devices within a bound time, regardless of network environments.

SUMMARY OF THE INVENTION

In view of the foregoing, it is an object of the embodiments of the present invention to provide a coordination-free rendezvous method for a communication network that is capable of providing devices in the telecommunication network with broad-sense rendezvous (e.g., communication windows) or meeting without temporal synchronization or explicit signaling among the devices.

According to the embodiments of the present invention, time is divided into superslots each of which is further divided into slots. At least one first-class slot and at least one second-class slot are selected out of the slots of each superslot. The relative position between the first-class slot and the second-class slot is changed every superslot, whereby the first-class slots or the second-class slots between or among devices of the communication network may overlap each other in a periodic manner.

According to one type of rendezvous, the first-class slot is a static slot whose position remains unchanged in every superslot, and the second-class slot is a moving slot whose position changes every superslot.

According to another type of rendezvous, the first-class slot is a slow moving slot, and the second-class slot is a fast moving slot, where a sub-cycle is defined as a time period for the fast moving slot to move from an initial position and return back to its initial position. The slow and fast moving slots change their position in a manner such that the fast moving slot changes its position every superslot in the sub-cycle, while the slow moving slot remains unchanged in the same sub-cycle but changes its position in the subsequent sub-cycle.

According to a further type of rendezvous, the first-class slot is a static slot whose position remains unchanged in every superslot, and the second-class slots include a number of moving slots with different speed levels of which the higher the speed level the less frequently the moving slot changes its position.

DETAILED DESCRIPTION OF THE INVENTION

A detailed description of the present invention will be provided in connection with the following embodiments, which are not intended to limit the scope of the present invention and which can be adapted for other applications. For example, the illustrated embodiments may be generally adapted to a telecommunication network such as that of a cognitive radio or MANET protocol as mentioned above in the background of the invention.

Embodiment I

Figure 1:
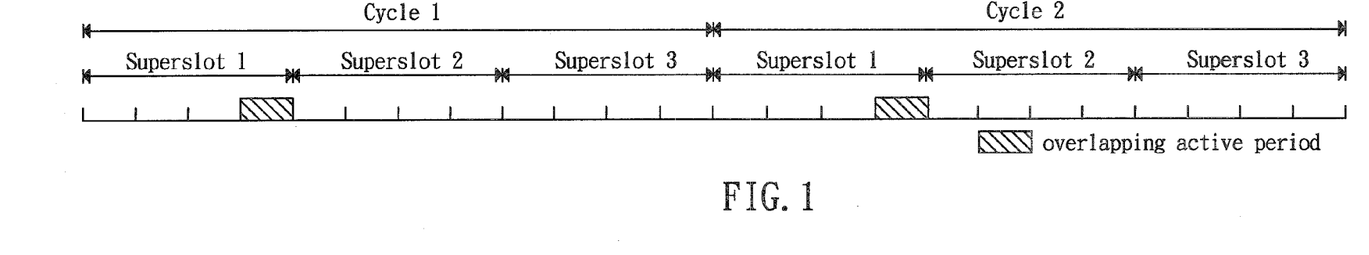
FIG. 1 shows an exemplary timing diagram according to a first embodiment of the present invention.

FIG. 1 shows an exemplary timing diagram according to a first embodiment of the present invention. In the embodiment, time is divided into superslots, and each superslot is further divided into N slots (e.g., 4 slots as shown in the figure). According to the present embodiment (i.e., type-I rendezvous), the rendezvous or overlapping active period (e.g., communication window) will be located in one or more slots in a periodic manner. In the embodiment, an active period can be any time period during which a specific task is performed. The task can be, for example, seeking TV signals in DSA or staying awake in a power-saving MANET. As exemplified in FIG. 1, a type-I rendezvous (e.g., wake-up mode in a MANET or scanning mode in a DSA network) is located in the $4^{th}$ slot of the first superslot, and it appears every 12 slots (i.e., 3 superslots). In the example, the cycle of the associated device is thus 3-superslots long. In this specification, the terms "rendezvous," "overlapping" and "meeting" may be used interchangeably.

In order to have type-I rendezvous, a device, say device X, selects $M_X (\geq 2)$ slots out of every N slots (i.e., one superslot) with a duty cycle of $M_X/N$. Out of the $M_X$ slots, device X then selects $m_{s,X}$ static slot(s) and $m_{v,X} (=M_X - m_{s,X})$ moving slots. In this specification, the static slot is also called the first-class slot, and the moving slot the second-class slot. The positions of the static slots in every superslot remain unchanged, while the positions of the moving slots change every superslot. Let the slot indexes of device X's static slots be $C_{X,1}, C_{X,2}, \ldots, C_{X,m_{s,X}}$, and the slot indexes of the moving slots in the i-th superslot be $V_{X,1}^i, V_{X,2}^i, \ldots, V_{X,m_{v,X}}^i$. According to the embodiment, each moving slot changes its position according to the following equation $$V_{X,k}^{i+1} += (V_{X,k}^i + d) \bmod N$$

for any i and $1 \leq k \leq m_{v,X}$, where d is the smallest positive integer such that $V_{X,k}^{i+1} \neq C_{X,j}$ for $1 \leq j \leq m_{s,X}$ and i is the superslot index. These $M_X$ slots uniquely determine the job schedule of device X.

Figure 2A:
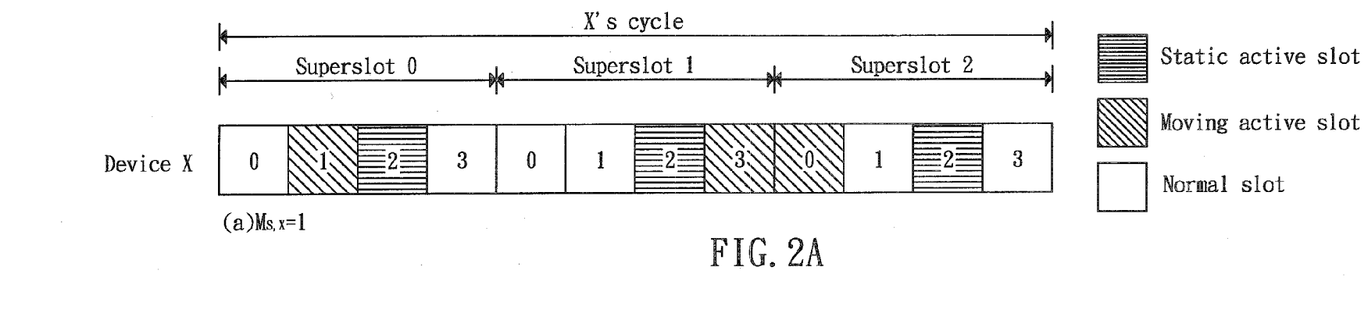
FIG. 2A and FIG. 2B show exemplary job schedules of device X according to the first embodiment.
Figure 2B:
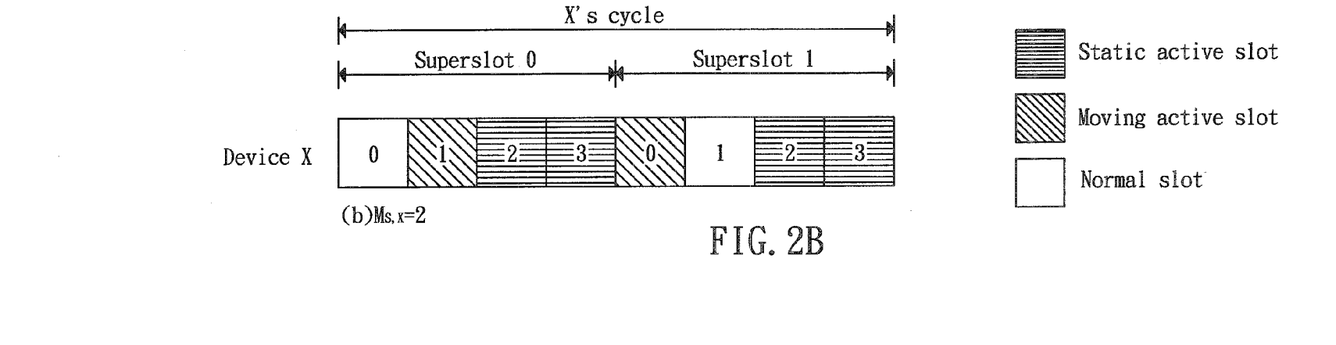

FIG. 2A shows an exemplary job schedule of device X for the case of $m_{s,X}=1$, $m_{v,X}=1$, $C_{X,1}=2$ and $V_{X,1}^1=1$ when N=4. It is shown in the figure that the moving slot moves to the nearest unoccupied slot on the right every superslot and returns to the first unoccupied slot upon reaching the end of a superslot. As a result, the slots schedule of device X repeats itself every N*(N−1)=12 slots. In general, the job schedule repeats itself every $N*(N-m_{s,X})$ slots. FIG. 2B shows another exemplary job schedule of device X for the case of $m_{s,X}=2$, $m_{v,X}=1$, $C_{X,1}=2$, $C_{X,2}=3$ and $V_{X,1}^1=1$ when N=4. As a result, the slots schedule of device X repeats itself every N*(N−2)=8 slots.

Figure 3:
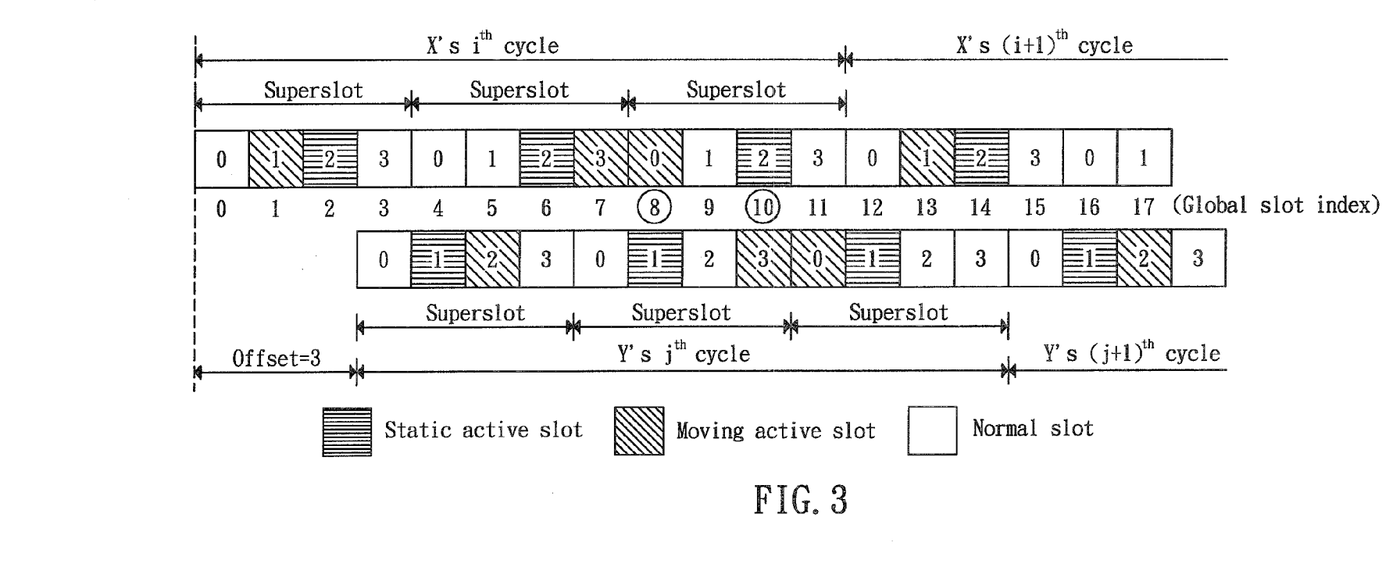
FIG. 3 illustrates an exemplary rendezvous or communication window being provided between device X and device Y according to the first embodiment.

According to the type-I job schedule illustrated above, two devices may have type-I rendezvous without one knowing (e.g., receiving) the parameters selected by the other. FIG. 3 illustrates an exemplary rendezvous being provided between device X and device Y with a clock offset of 3. In the example, device X chooses $m_{s,X}=1$, $m_{v,X}=1$, $C_{X,1}=2$ and $V_{X,1}^1=1$ when N=4, while device Y chooses $m_{s,Y}=1$, $m_{v,Y}=1$, $C_{Y,1}=1$ and $V_{Y,1}^1=2$ when N=4. Accordingly, device X and device Y have their job schedules overlapped in two slots (e.g., global slots 8 and 10) every 12 slots. From device X's perspective, the overlapped slots are slots 0 and 2. From device Y's perspective, the overlapped slots are slots 1 and 3.

Embodiment II

Figure 4:
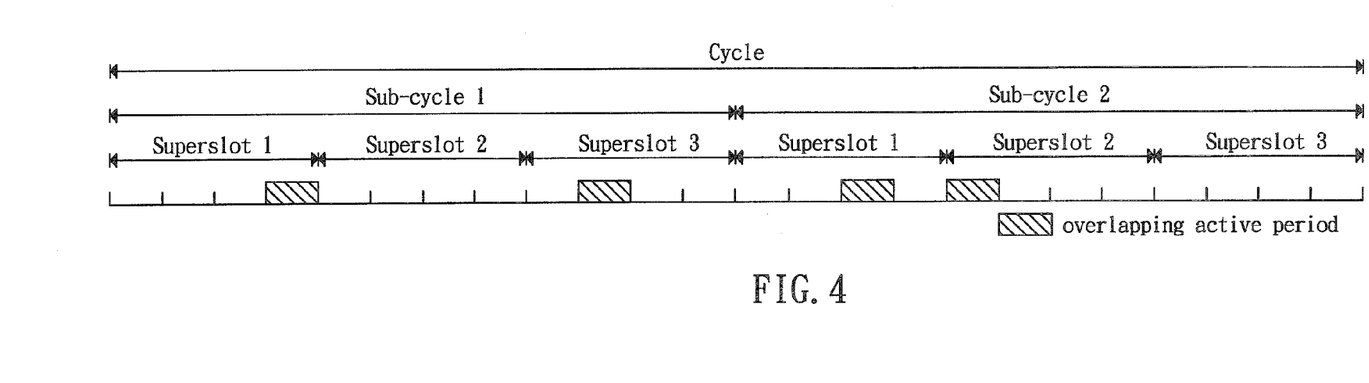
FIG. 4 shows an exemplary timing diagram according to a second embodiment of the present invention.

FIG. 4 shows an exemplary timing diagram according to a second embodiment of the present invention. According to the present embodiment (i.e., type-II rendezvous), the rendezvous will be located in the time slots with all different slot indexes within a cycle. As exemplified in FIG. 4, the rendezvous is located in a $4^{th}$ slot of superslot 1 of sub-cycle 1, $2^{nd}$ slot of superslot 3 of sub-cycle 1, $3^{rd}$ slot of superslot 1 of sub-cycle 2, and $1^{st}$ slot of superslot 2 of sub-cycle 2.

In order to have type-II rendezvous, a device, say device X, selects $M_X (\geq 2)$ slots out of every N slots (i.e., one superslot). Out of the $M_X$ slots, device X then selects $m_s (\geq 1)$ slow moving slot(s) and $m_f (\geq 1)$ fast moving slot(s), and $m_s + m_f = M_X$. The total time period from the fast moving slot moving from its initial position to its return back to its initial position is referred to as a sub-cycle. If the slow moving slot moves to the slot which is also the initial slot of the fast moving slot, the fast moving slot will move to the next available slot. It is noted that when the fast moving slot changes its position in a sub-cycle, the slow moving slot remains in the same sub-cycle. The indexes of initial slots of the fast and slow moving slots are $V_{Xf,1}^1, V_{Xf,2}^1, V_{Xf,3}^1 \ldots V_{Xf,m_f}^1$ and $V_{Xs,1}^1, V_{Xs,2}^1, V_{Xs,3}^1 \ldots V_{Xs,m_s}^1$, respectively. The fast moving slot changes its position every superslot according to the following equation $$V_{Xf,k}^{i+1} = (V_{Xf,k}^i + d) \bmod N$$

for $1 \leq i \leq N-1$ and $1 \leq k \leq m_f$, where d is the smallest positive integer such that $V_{Xf,k}^{i+1} \neq V_{Xs,j}^{i+1}$ for $1 \leq j \leq m_s$ and i is the superslot index.

On the other hand, the slow moving slot changes its positions according to the following equation $$V_{Xs,k}^{j+1} = (V_{Xs,k}^j + 1) \bmod N$$

for $1 \leq j \leq N-1$ and $0 \leq k \leq m_s - 1$, where j is the sub-cycle index.

Figure 5:
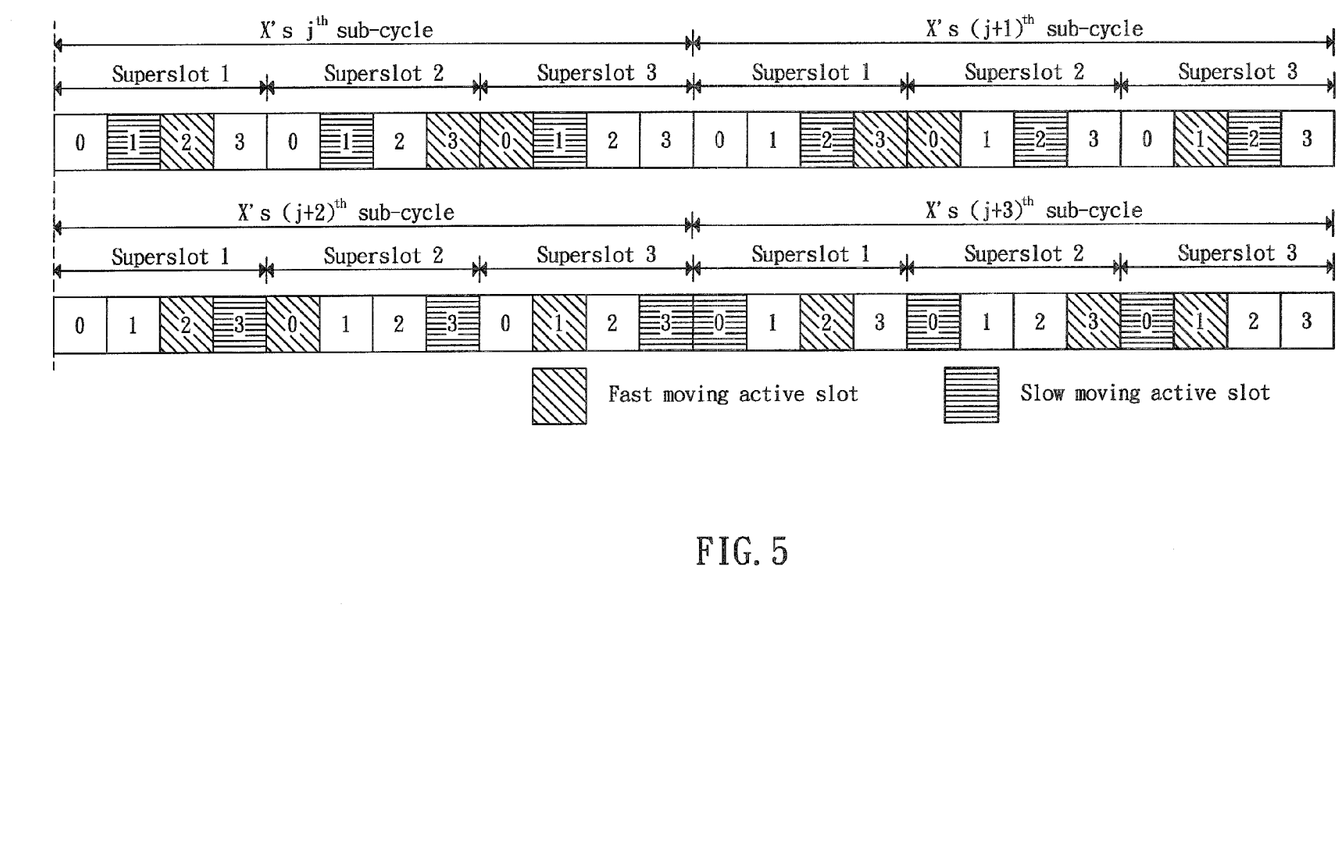
FIG. 5 shows exemplary job schedules of device X according to the second embodiment.

FIG. 5 shows an exemplary job schedule of device X for the case of $V_{Xf,1}^1=2$ and $V_{Xs,1}^1=1$ when N=4. It is shown in the figure that in the second sub-cycle, the slow moving slot and the initial slot of the fast moving slot are supposed to be in slot 2. Therefore, the fast moving slot uses slot 3 as its initial slot instead. After N+1 sub-cycles, the slow moving slot will return to its initial slot and the length of N sub-cycles is referred to as a cycle.

Figure 6:
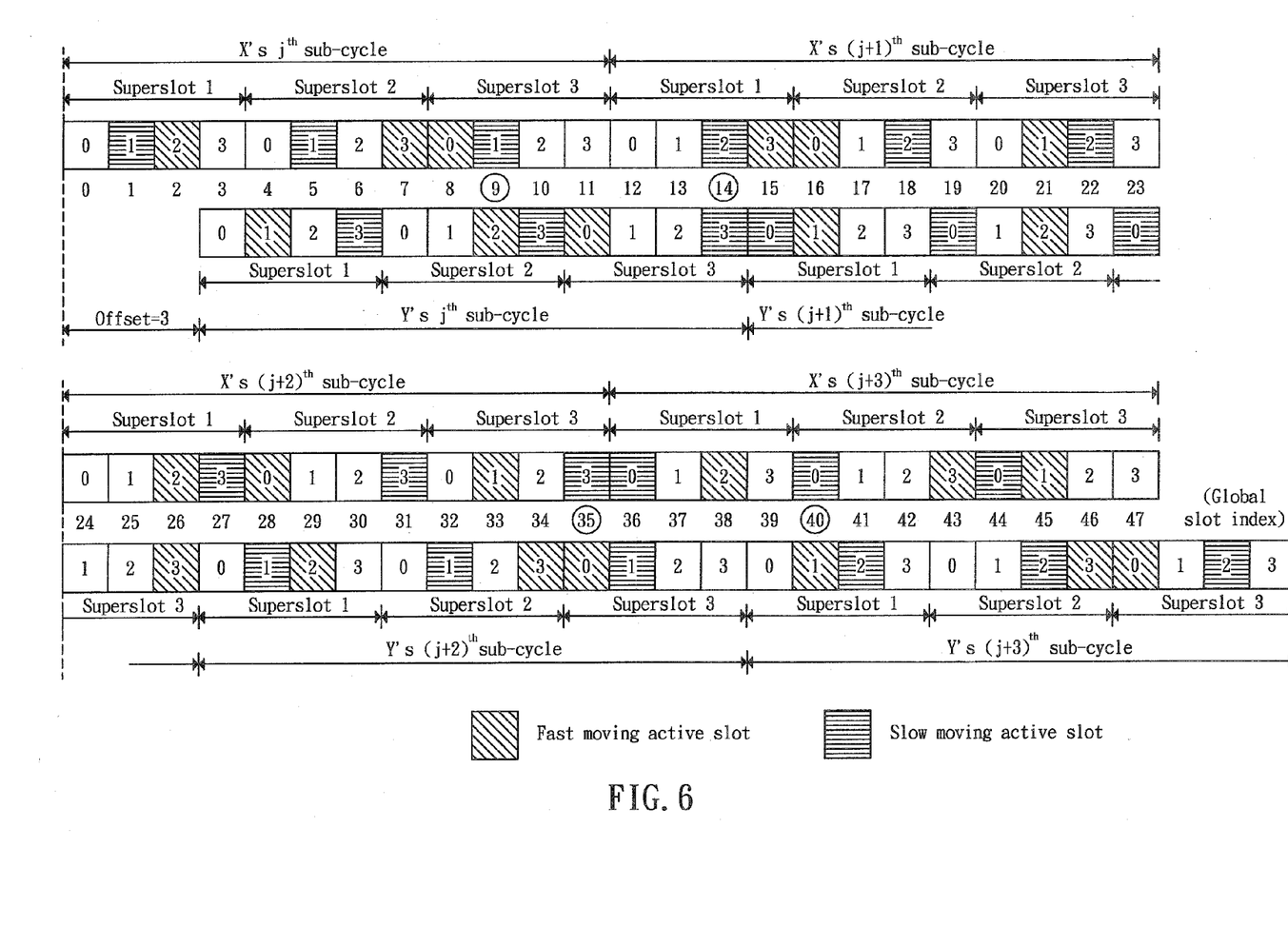
FIG. 6 illustrates an exemplary rendezvous being provided between device X and device Y according to the second embodiment.

According to the type-II job schedule illustrated above, two devices may have type-II rendezvous without one knowing (e.g., having received) the parameters selected by the other. FIG. 6 illustrates an exemplary rendezvous being provided between device X and device Y with a clock offset of 3. In the example, device X has $V_{Xf,1}^1=2$ and $V_{Xs,1}^1=1$ and device Y has $V_{Yf,1}^1=1$ and $V_{Ys,1}^1=3$. Accordingly, device X and device Y have their job schedules overlapped in at least four slots (e.g., global slots 9, 14, 35 and 40). From device X's perspective, the overlapped slots are slots 1, 2, 3 and 0. From device Y's perspective, the overlapped slots are slots 2, 3, 0 and 1.

Alternative Embodiment I

The present embodiment or generalized type-I rendezvous is based on type-II rendezvous, and further includes a static slot as in type-I rendezvous. Accordingly, three devices may have type-I rendezvous without any coordination among them. In general, N devices may have type-I rendezvous without any coordination among them.

In order to have generalized type-I rendezvous, each device has to select n slots which include at least one static slot and at least n−1 slots moving at different speeds. Device X selects $M_X (\geq n)$ slots out of every N slots (i.e., one superslot). Different devices may be allowed to choose different M's.

Out of the $M_X$ slots, device X then selects $m_{s,X} (\geq 1)$ static slots and $m_{vl,X} (\geq 1)$ moving slots, where l indicates the speed level of a moving slot and $1 \leq l \leq n-1$. Therefore, $M_X = m_{s,X} + m_{v,X}$, where $m_{v,X} = M_{v1,X} + M_{v2,X} + \ldots + m_{v(n-1),X}$. The positions of the static slots remain unchanged in every superslot and their slot indexes are denoted as $C_{X,1}$, $C_{X,2}$, ..., $C_{X,m_sX}$, respectively. On the other hand, each level-l moving slot changes its position every level-(l−1) cycle. Let the initial slot indexes of the l-level moving slots be $Vl_{X,1}^1$, $Vl_{X,2}^1$, ..., $Vl_{X,m_{vlX}}^1$, respectively. Each level-l moving slot changes its positions according to the following equation $$Vl_{X,k}^{i+1} = (Vl_{X,k}^i + d) \bmod N$$

for $1 \le k \le m_{vlX}$, where i is the index of the level-(l−1) cycle and $1 \le i \le N-(M_X-n_l)$, $n_l$ is the sum of $m_{v1,X}+m_{v2,X}+\ldots+m_{vl,X}$, d is the smallest positive integer such that $Vl_{X,k}^{i+1} \ne C_{X,j}$ or $Vl_{X,k}^{i+1} \ne Vh_{X,r}^{i+1}$, for $1 \le j \le m_{sX}$, $1 < h \le n-1$, and $1 < r < m_{vh,X}$. It is noted that the length of a level-i cycle is equal to $N-(M_X-n_l)$ level-(l−1) cycle length.

Accordingly, the length of a level-0 cycle is one superslot long. Within $N-(M_X-n_1)$ superslots which is a level-1 cycle, the $m_{v1,X}$ level-1 moving slots change their positions while the moving slots with speed levels higher than 1 remain unchanged. In other words, the higher the speed level, the less frequently a moving slot changes its position. It is noted that the level-(n−1) will have a length equal to $Nx(N-1)!/(N-n)!$ slots for all devices with parameter M=n, where n≥2. The job schedule of a device repeats itself every level-(n−1) cycle.

Figure 7A:
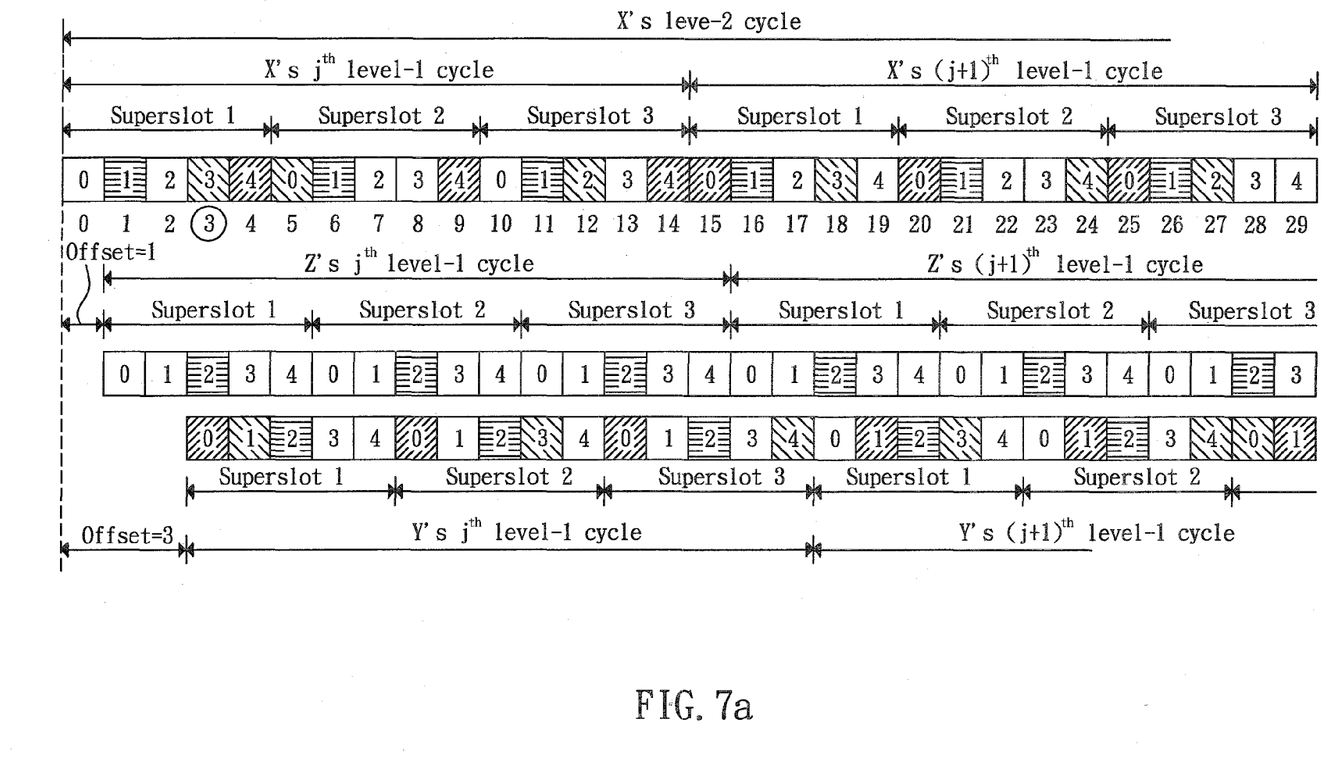
FIG. 7a and FIG. 7b illustrate an exemplary rendezvous being provided among device X, device Y and device Z according to an alternative first embodiment.
Figure 7B:
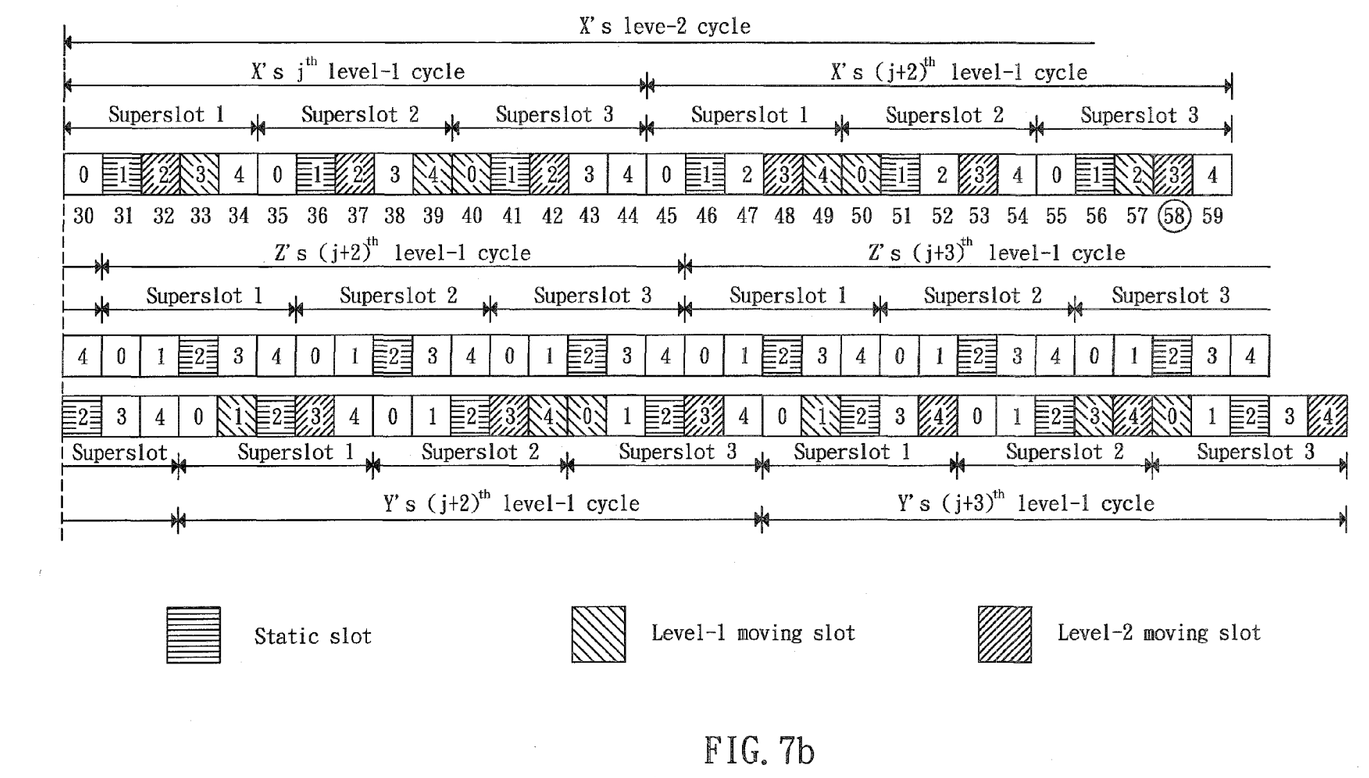

FIG. 7a and FIG. 7b illustrate an exemplary rendezvous being provided among device X, device Y and device Z. Let devices X, Y and Z select $M_X=M_Y=M_Z=3$ for the case of N=5, and the length of level-2 cycle is equal to 60 slots. Furthermore, let devices X and Y choose $C_{X,1}=1$, $V1_{X,1}^1=3$, $V2_{X,1}^1=4$, $C_{Y,1}=2$, $V1_{Y,1}^1=0$, $V2_{Y,1}^1=1$ respectively, and the time offset between devices X and Y is 3. Device Z only uses the static slot with $C_{Z,1}=2$ and the offset between devices X and Z is 1. As a result, devices X, Y and Z overlap in global slots 3 and 58.

Embodiment III

Figure 8:
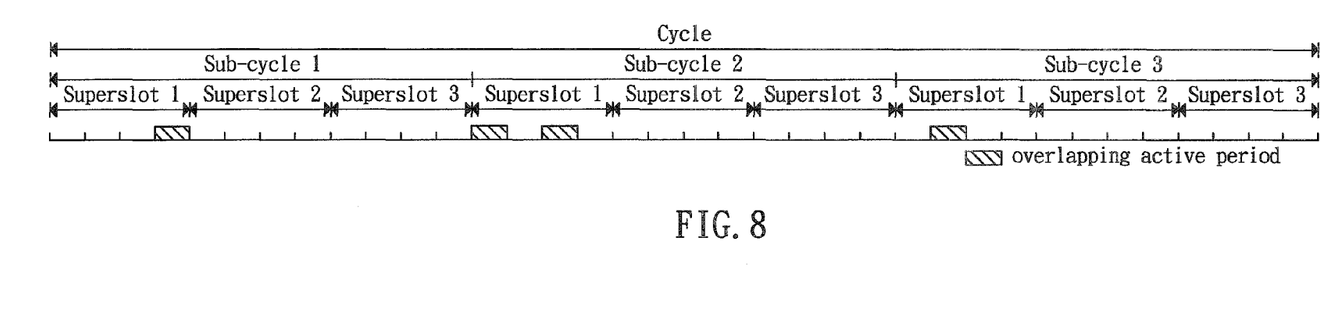
FIG. 8 shows an exemplary timing diagram according to a third embodiment of the present invention.

FIG. 8 shows an exemplary timing diagram according to a third embodiment of the present invention. The present embodiment (i.e., type-III rendezvous) is the same as the second embodiment except that the rendezvous is located in those superslots with the same superslot index within a cycle. As exemplified in FIG. 8, the rendezvous are located in a $4^{th}$ slot of the first superslot 1, $1^{st}$ and $3^{rd}$ slots of the second superslot 1, and $2^{nd}$ slot of the third superslot 1. It is noted that they are all located in the superslots with superslot index 1.

The device in the previous embodiments changes the job schedule on a per slot basis, while the device in the present embodiment changes the schedule on a two-slot basis. In order to have type-III rendezvous, a device, say device X, selects $m_{v,X}$ (≥2) pairs of slots out of every N slots. Out of the $m_{v,X}$ pairs, device X then selects $m_{vr,X}$ slot pairs that move toward the right while $m_{vl,X}$ slot pairs that move toward the left, where $m_{vr,X} \ge 1$, $m_{vl,X} \ge 1$, and $m_{vr,X}+m_{vl,X}=m_{v,X}$. Let the initial slot indexes of device X's right-moving slot pairs be $(V_{Xr,11}^{1,1}, V_{Xr,12}^{1,1})$, $(V_{Xr,21}^{1,1}, V_{Xr,22}^{1,1})$, ..., $(V_{Xr,m_{vr}X1}^{1,1}, V_{Xr,m_{vr}X2}^{1,1})$, where $V_{Xr,p1}^{1,1}$ is unique and randomly selected from 0 to N−1, and $V_{Xr,p2}^{1,1}=(V_{Xr,p1}^{1,1}+1) \bmod N$ for $1 \le p \le m_{vr,X}$, and let the slot indexes of the left-moving pairs be $(V_{Xl,11}^{1,1}, V_{Xl,12}^{1,1})$, $(V_{Xl,21}^{1,1}, V_{Xl,22}^{1,1})$, ..., $(V_{Xl,m_{vl}X1}^{1,1}, V_{Xl,m_{vl}X2}^{1,1})$, where $V_{Xl,q1}^{1,1}$ is unique and randomly selected from 0 to N−1, and $V_{Xl,q2}^{1,1}=(V_{Xl,q1}^{1,1}+1) \bmod N$ for $1 \le q \le m_{vl,X}$.

Each right-moving slot pair moves one slot to the right every superslot and returns to the first slot after reaching the last slot of a superslot according to the following equation $$V_{Xr,p1}^{i+1,j} = (V_{Xr,p1}^{i,j}+1) \bmod N$$

for $1 \le i \le N-1$, $j \in \{1, 2, \ldots, N\}$, where i is the superslot index and j is the index of a short-term cycle (see below). Each left-moving slot pair moves one slot to the left every superslot and returns to the last slot after reaching the first slot of a superslot according to the following equation $$V_{Xl,q1}^{i+1,j} = (V_{Xl,q1}^{i,j}-1) \bmod N$$

After N times of moving (i.e., N superslots), each moving slot pair will move back (e.g., return) to its original position. The total time for such N times of moving is referred to as the short-term cycle. After one short-term cycle, moving slot pairs will change their initial positions $V_{Xr,p1}^{1,j}$ and $V_{Xl,q1}^{1,j}$ according to the following equations $$V_{Xr,p1}^{1,j+1} = (V_{Xr,p1}^{1,j}+1) \bmod N,$$

$$V_{Xl,q1}^{1,j+1} = (V_{Xl,q1}^{1,j}+1) \bmod N,$$

where j is the index of short-term cycle. After N times of changing the initial position (i.e., N short-term cycles), the values of $V_{Xr,p1}^{1,j}$ and $V_{Xl,q1}^{1,j}$ will change back to the original initial value (i.e., $V_{Xr/l,p/q}^{1,j+N} = V_{Xr/l,p/q}^{1,j}$). This time duration is referred to as a long-term cycle.

Figure 9:
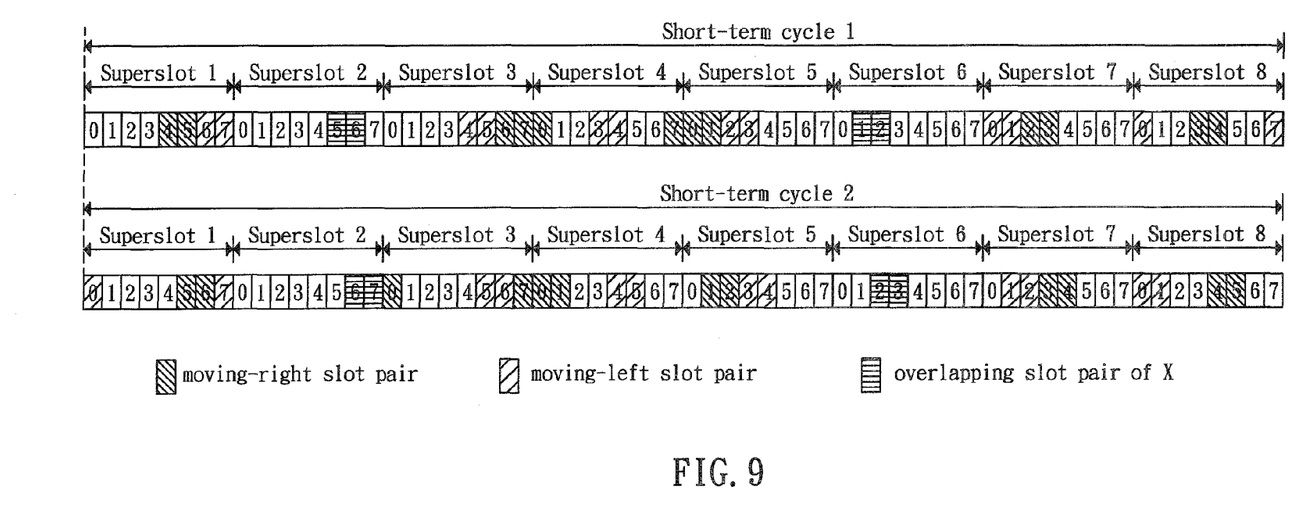
FIG. 9 shows exemplary job schedules of device X according to the third embodiment.
Figure 10A:
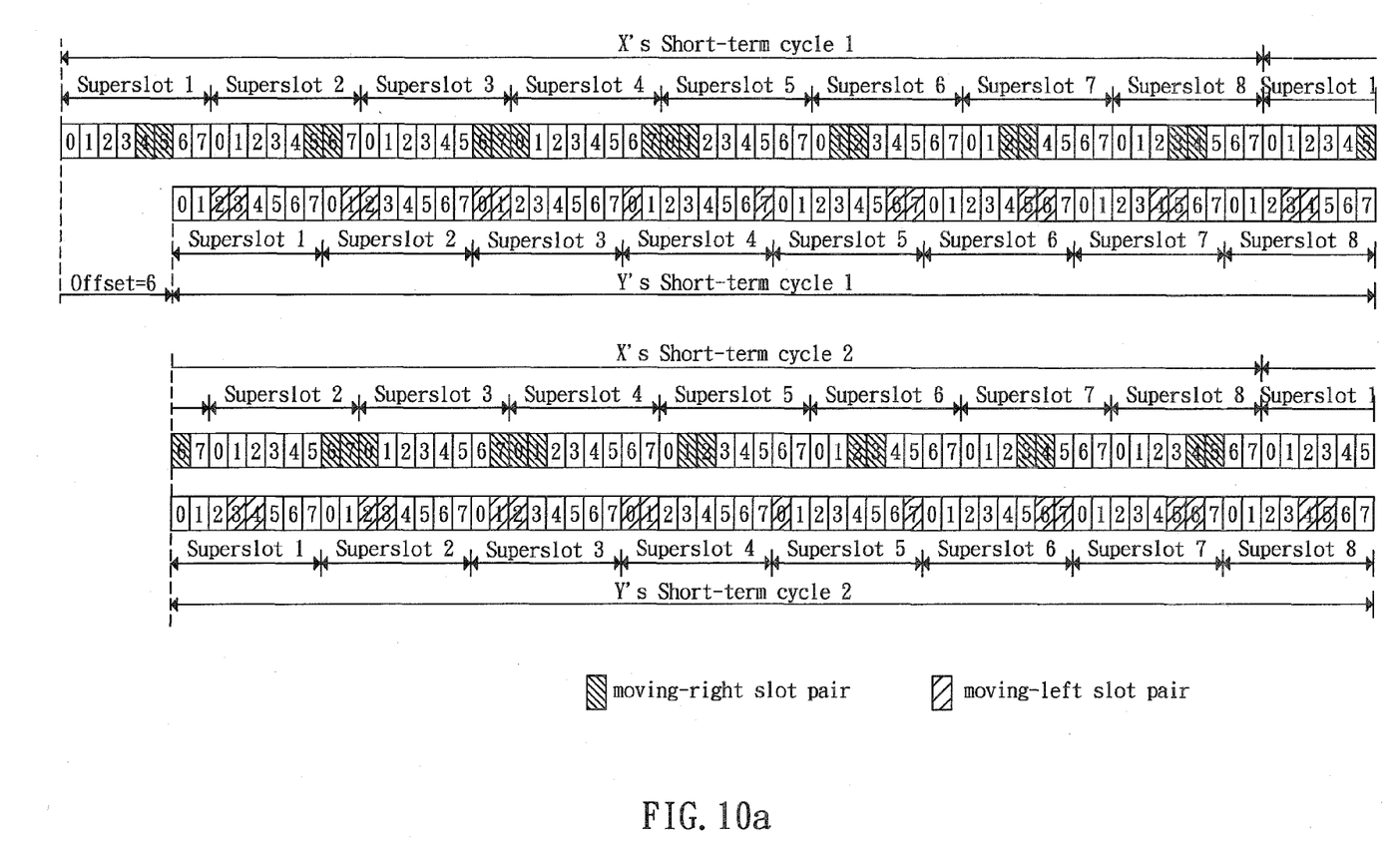
FIG. 10a, FIG. 10b, FIG. 10c, and FIG. 10d illustrate an exemplary rendezvous being provided between device X and device Y according to the third embodiment.
Figure 10B:
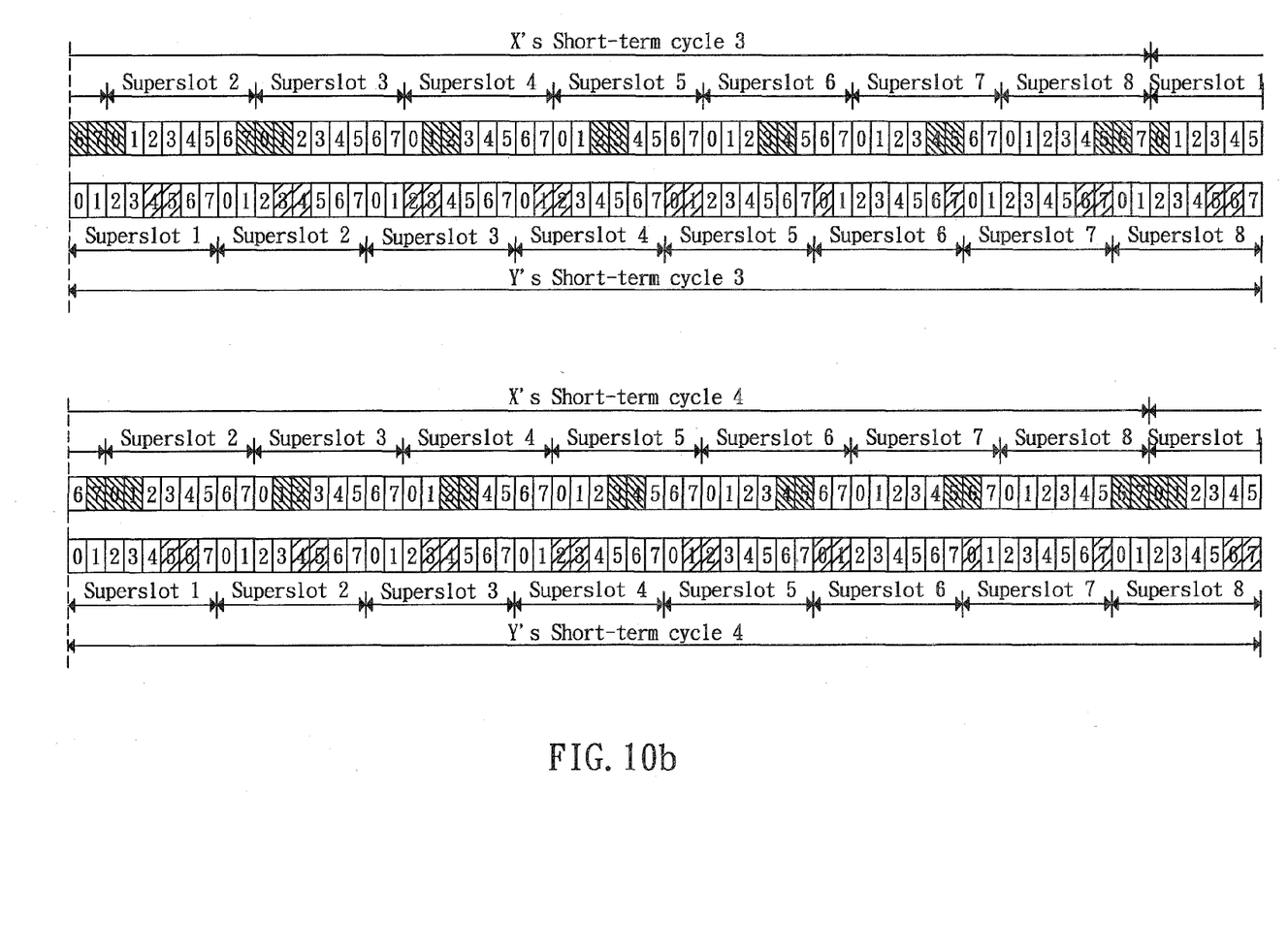
Figure 10C:
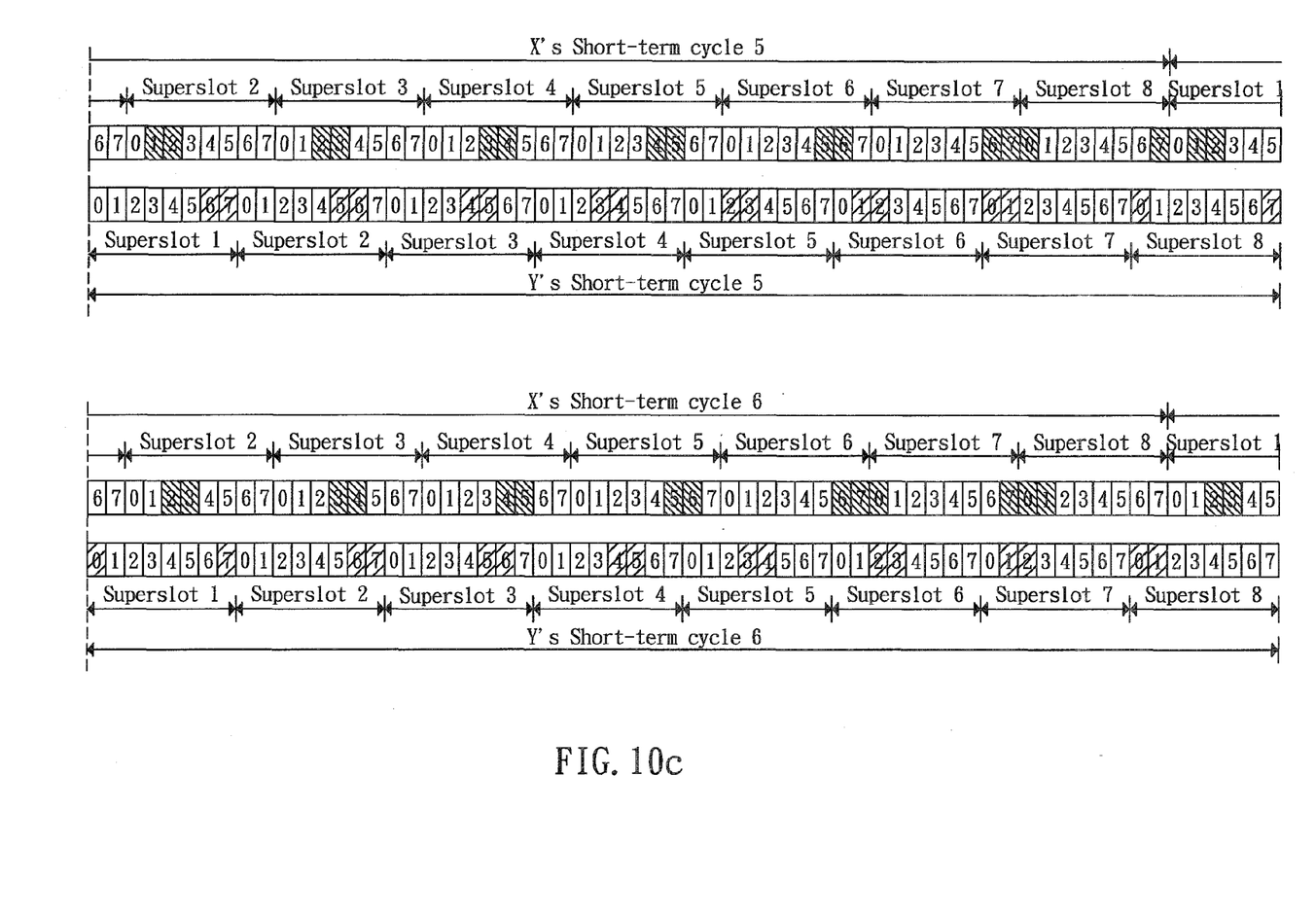
Figure 10D:
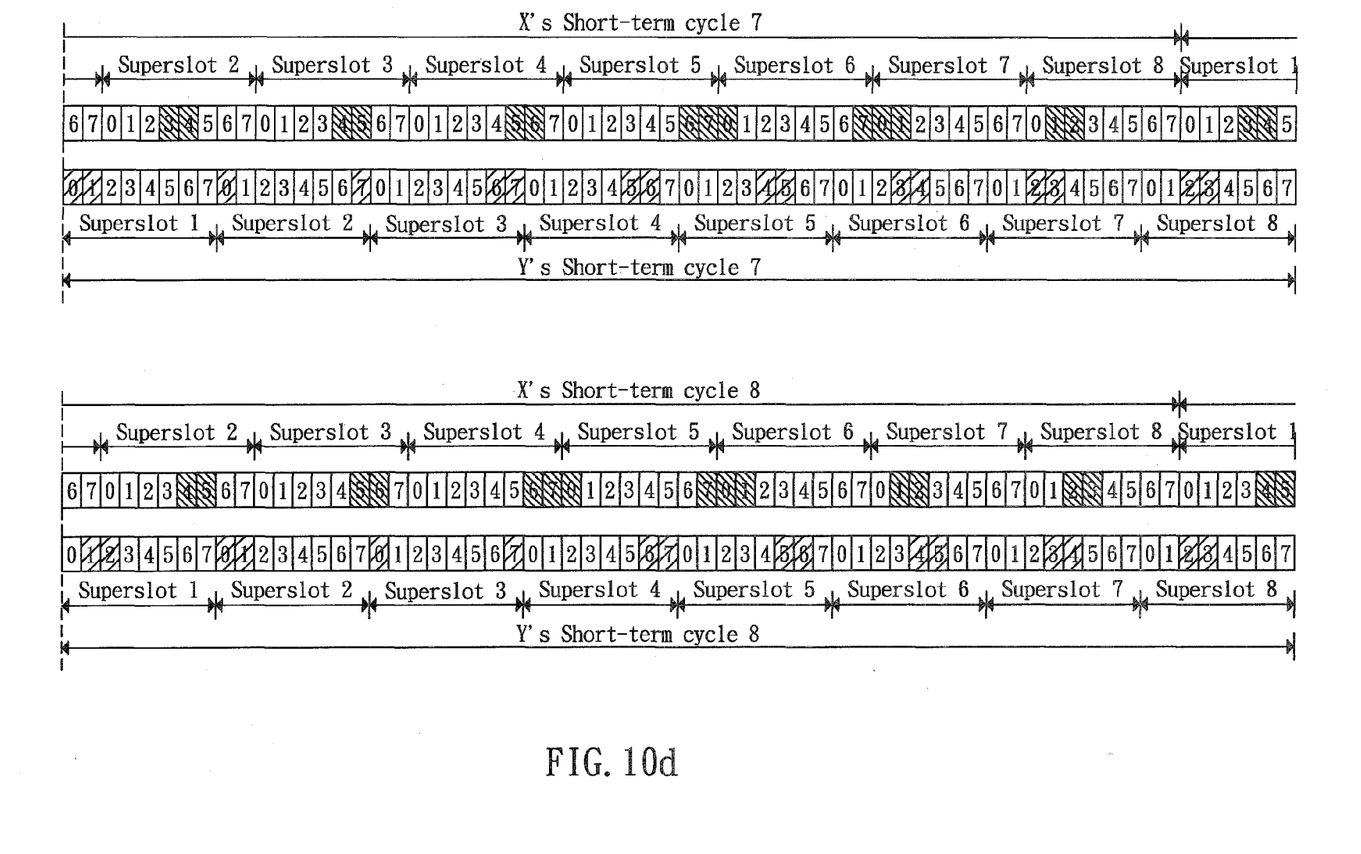

FIG. 9 shows an exemplary job schedule of device X for the case of $m_{vr,X}=m_{vl,X}=1$ and $V_{Xr,11}^{1,1}=4$ and $V_{Xl,11}^{1,1}=6$ for N=8. The short-term and long-term cycles in this case are 64 slots and 256 slots, respectively.

According to the type-III job schedule illustrated above, two devices may have type-III rendezvous without one knowing (e.g., being provided with) the parameters selected by the other. FIG. 10a, FIG. 10b, FIG. 10c, and FIG. 10d illustrate an exemplary rendezvous being provided between device X and device Y with clock offset of 6, given $V_{Xr,11}^{1,1}=4$ and $V_{Y1,11}^{1,1}=2$ and N=8. It is observed that these two moving slot pairs overlap twice in a short-term cycle (i.e., device X's $3^{rd}$ and $7^{th}$ superslots). Furthermore, the overlapping slots will occur in different positions of these superslots in different short-cycles. For example, in the $3^{rd}$ superframe of device X's $1^{st}$ short-term cycle, the overlapping slots are slot 6 and slot 7. In the $3^{rd}$ superframe of device X's $2^{nd}$ short-term cycle, there is one overlapping slot in slot 0. In the $3^{rd}$ superframe of device X's $3^{rd}$ short-term cycles, there is one overlapping slot in slot 1. Accordingly, after N short-term cycles or a long-term cycle, the overlapping slot will take every slot position (from 0 to N−1) in the $3^{rd}$ superframe of device X. The same property is applicable to the $7^{th}$ superframe of device X. It is further noted that this algorithm may be applied to type-II rendezvous where 3 devices obtain at least one overlapping slot without any coordination among them.

According to the present invention, two or more communication network devices may have type-I, type-II, type-III or other type rendezvous without one knowing (e.g., receiving) the parameters selected by the other(s). In order to have type-I, type-II, type-III or other type rendezvous, this invention provides various coordination-free rendezvous methods for a communication network, which can be implemented using computer program product with program code or program code means for carrying out one or more steps (e.g., all steps) of any one or more of the above-mentioned coordination-free rendezvous methods on a communication network device. Furthermore, the computer program product can be stored on a storage (e.g., a storage means such as one or more of a floppy disc, CD ROM, Flash, hard drive, and removable storage drive) which can be coupled to, accessed, read by, and/or in communication with the communication network device.

Variations of the present invention may be implemented using hardware, software (e.g., computer program product), or a combination thereof. When implemented primarily in hardware, for example, a processor of a communication network device can be arranged to perform one or more steps (e.g., all) of the above-mentioned coordination-free rendezvous methods. Additionally, the communication network device can comprise or be one or more of a mobile device, laptop, desktop, computer peripheral, etc.

Although specific embodiments have been illustrated and described, it will be appreciated by those skilled in the art that various modifications may be made without departing from the scope of the present invention, which is intended to be limited solely by the appended claims.

What is claimed is:

1. A coordination-free rendezvous method for a plurality of unlicensed devices in different communication networks to detect a plurality of licensed devices, the method comprising:
   dividing time of each of the unlicensed devices into a plurality of superslots, and dividing each said superslot into a plurality of slots;
   selecting at least one first-class slot and at least one second-class slot out of the slots of each said superslot, wherein when the first-class slots or the second-class slots occur, the unlicensed devices perform the same operations to detect the licensed devices, whereby the licensed devices are not interfered with the unlicensed devices;
   changing a relative position between the first-class slot and the second-class slot every said superslot, wherein a speed level of the second-class slot is higher than a speed level of the first-class slot, whereby the first-class slots or the second-class slots between or among the devices are able to overlap each other in a periodic manner, whereby the unlicensed devices in different communication networks are able to perform the same operations at the same time to detect the licensed devices on a coordination-free basis.

2. The method of claim 1, wherein the communication network is a dynamic spectrum access (DSA) network.

3. The method of claim 1, wherein the communication network is a mobile ad hoc network (MANET).

4. The method of claim 1, wherein the first-class slot is a static slot whose position remains unchanged in every said superslot, and the second-class slot is a moving slot whose position changes every said superslot.

5. The method of claim 4, wherein the moving slot moves to a nearest right-hand unoccupied slot every said superslot, and then returns to a first unoccupied slot upon reaching a most right-hand slot of said superslot.

6. The method of claim 5, wherein each said moving slot changes its position according to the following equation $$V_{X,k}^{i+1}=(V_{X,k}^{i}+d)\bmod N$$

for any i and $1 \leq k \leq m_{v,X}$, where d is a smallest positive integer such that $V_{X,k}^{i+1} \neq C_{X,j}$ for $1 \leq j \leq m_{s,X}$ and i is the superslot index; wherein $m_{s,X}$ is the number of the static slots in each said superslot for a device X, $m_{v,X}$ is the number of the moving slots in each said superslot for the device X, $C_{X,j}$ is a slot index of the j-th static slot, and $V_{X,k}^{i}$ is a slot index of the k-th moving slot in the i-th superslot.

7. The method of claim 1, wherein the first-class slot is a slow moving slot, and the second-class slot is a fast moving slot, a sub-cycle being a time period for the fast moving slot to move from, and return back to, its initial position, wherein the slow and fast moving slots change their position in a manner such that the fast moving slot changes its position every said superslot in the sub-cycle, while the slow moving slot remains unchanged in the same sub-cycle but changes its position in the subsequent sub-cycle.

8. The method of claim 7, wherein each said fast moving slot changes its position according to the following equation $$V_{Xf,k}^{i+1}=(V_{Xf,k}^{i}+d)\bmod N$$

for $1 \leq i \leq N-1$ and $1 \leq k \leq m_f$, where $m_f$ is the number of the fast moving slots in each said superslot and d is a smallest positive integer such that $V_{Xf,k}^{i+1} \neq V_{Xs,j}^{i+1}$ for $1 \leq j \leq m_s$ and i is the superslot index and $m_s$ is the number of the slow moving slots in each said superslot, $V_{Xs,k}^{i}$ is a slot index of the k-th slow moving slot in the i-th superslot, and $V_{Xf,k}^{i}$ is a slot index of the k-th fast moving slot in the i-th superslot;
   wherein each said slow moving slot changes its position according to the following equation $$V_{Xs,k}^{j+1}=(V_{Xs,k}^{j}+1)\bmod N$$

for $1 \leq j \leq N-1$ and $0 \leq k \leq m_s-1$, where j is the sub-cycle index.

9. The method of claim 1, wherein the first-class slot is a static slot whose position remains unchanged in every said superslot, and the second-class slots include a plurality of moving slots with different speed levels of which the higher the speed level the less frequently the moving slot changes its position.

10. The method of claim 9, wherein the moving slot with level-$l$ changes its position according to the following equation $$Vl_{X,k}^{i+1}=(Vl_{X,k}^{i}+d)\bmod N$$

for $1 \leq k \leq m_{vl,X}$, where i is an index of the level-(l−1) cycle and $1 \leq i \leq N-(M_X-n_l)$, $n_l$ is sum of $m_{v1,X}+m_{v2,X}+\ldots m_{vl,X}$, d is a smallest positive integer such that $Vl_{X,k}^{i+1} \neq C_{X,j}$ or $Vl_{X,k}^{i+1} \neq Vh_{X,r}^{i+1}$ for $1 \leq j \leq m_{s,X}$, $1 < h \leq n-1$, and $1 < r < m_{vh,X}$;
   wherein $m_{s,X}$ is the number of the static slots in each said superslot for a device X, $m_{vl,X}$ is the number of the level-l moving slots in each said superslot for the device X, $C_{X,j}$ is a slot index of the j-th static slot, and $Vl_{X,k}^{i}$ is a slot index of the k-th level-l moving slot in the i-th superslot.

11. The method of claim 1, wherein the first-class slots include a left-moving slot pair that moves one slot to a left-hand side every said superslot and then returns to the last slot after having reached a most left-hand slot of said superslot, and the second-class slots include a right-moving slot pair that moves one slot to a right-hand side every said superslot and then returns to the first slot after having reached a most right-hand slot of said superslot.

12. The method of claim 11, wherein the right-moving slot pair moves its position according to the following equation $$V_{Xr,p1}^{i+1,j}=(V_{Xr,p1}^{i,j}+1)\bmod N$$

for $1 \leq i \leq N-1$, $j \in \{1, 2, \ldots, N\}$, where i is the superslot index and j is an index of a short-term cycle that is defined as total time for each said right-moving and left-moving slot pairs to move from and then back to their original positions, and $V_{Xr,p1}^{i,j}$ is a slot index of the p1-th right-moving slot pair in the i-th superslot for a device X;
   wherein the left-moving slot pair moves its position according to the following equation $$V_{Xl,q1}^{i+1,j}=(V_{Xl,q1}^{i,j}-1)\bmod N$$

where $V_{Xl,q1}^{i,j}$ is a slot index of the q1-th left-moving slot pair in the i-th superslot for the device X.

13. The method of claim 12, wherein the right-moving and the left-moving slot pairs change their initial positions $V_{Xr,p1}^{1,j}$ and $V_{Xl,q1}^{1,j}$ according to the following equations $$V_{Xr,p1}^{1,j+1}=(V_{Xr,p1}^{1,j}+1)\bmod N,$$

$$V_{Xl,q1}^{1,j+1}=(V_{Xl,q1}^{1,j}+1)\bmod N,$$

where j is an index of the short-term cycle.

* * * * *